(12) United States Patent
Pearce et al.

(10) Patent No.: US 7,185,272 B2
(45) Date of Patent: Feb. 27, 2007

(54) METHOD FOR AUTOMATICALLY FILLING IN WEB FORMS

(76) Inventors: William M Pearce, 272 Macdonell Avenue, Toronto, Ontario (CA) M6R 2B1; Huanyu Tan, 705-24 Mabelle Avenue, Etobicoke, Ontario (CA) M9A 4X7

( * ) Notice: Subject to any disclaimer, the term of this patent is extended or adjusted under 35 U.S.C. 154(b) by 388 days.

(21) Appl. No.: 10/898,922

(22) Filed: Jul. 27, 2004

(65) Prior Publication Data

US 2005/0216356 A1    Sep. 29, 2005

Related U.S. Application Data

(60) Provisional application No. 60/491,004, filed on Jul. 30, 2003.

(51) Int. Cl.
*G06F 15/00* (2006.01)
*G06F 17/00* (2006.01)

(52) U.S. Cl. .................. 715/507; 715/505; 715/508

(58) Field of Classification Search ............. 715/505, 715/507, 508
See application file for complete search history.

(56) References Cited

U.S. PATENT DOCUMENTS 5,848,412 A * 12/1998 Rowland et al. ............ 707/9
5,983,227 A * 11/1999 Nazem et al. .............. 707/10
5,987,454 A * 11/1999 Hobbs ........................ 707/4
6,006,333 A * 12/1999 Nielsen ...................... 726/8
6,029,182 A * 2/2000 Nehab et al. ............ 715/523
6,032,162 A * 2/2000 Burke .................... 715/501.1

(Continued)

Primary Examiner—Doug Hutton
Assistant Examiner—N Hillery
(74) Attorney, Agent, or Firm—Elias Borges

(57) ABSTRACT

The present invention is a system for controlling in order to automatically fill in web enabled forms on a target web site. The system includes a web information database file containing a plurality of records relating to a plurality of web sites, including the target web site. Each record contains a plurality of information fields including an address field having the URL of the web site and a soft coding field. The soft coding field contains the particular coding instructions required by the web browser application to log onto, navigate and populate the web enabled forms of the web site at the URL. The system also includes a web agent application, the web agent application configured to read the web information database file and search the information contained in the web information database file in response to the search parameter information. The web agent application is configured to generate a packet of information corresponding to the search, said packet of information containing a least one web site URL and the search parameters used. The web interact application is also configured to read information from the web information database file and to read the packet of information from the web agent application. The web interact application is also configured to launch the web browser application to open a browser window and to control the operation of the web browser window. The web interact application is further configured to cause the browser application to navigate to the target web site by inserting the URL of the target web site into the browser. Finally, the web interact application is further configured to use the soft coding instructions to cause the web browser application to populate web enabled forms on the target web site with parameter data from the information package.

16 Claims, 5 Drawing Sheets

U.S. PATENT DOCUMENTS

| | | | |
|---|---|---|---|
| 6,182,229 B1 * | 1/2001 | Nielsen | 726/8 |
| 6,199,077 B1 * | 3/2001 | Inala et al. | 715/501.1 |
| 6,332,161 B1 * | 12/2001 | Sasson | 709/227 |
| 6,356,905 B1 * | 3/2002 | Gershman et al. | 707/10 |
| 6,484,263 B1 * | 11/2002 | Liu | 726/8 |
| 6,687,745 B1 * | 2/2004 | Franco et al. | 709/219 |
| 6,826,553 B1 * | 11/2004 | DaCosta et al. | 707/1 |
| 6,981,028 B1 * | 12/2005 | Rawat et al. | 709/217 |
| 2003/0041240 A1 * | 2/2003 | Roskind et al. | 713/168 |
| 2004/0205533 A1 * | 10/2004 | Lopata et al. | 715/507 |

* cited by examiner

METHOD FOR AUTOMATICALLY FILLING IN WEB FORMS

CROSS-REFERENCE TO RELATED APPLICATION

This application claims priority from Provisional patent application No. 60/491,004 filed Jul. 30, 2003, the entirety of which is incorporated herein by reference.

BACKGROUND OF THE INVENTION

Virtually every industry today uses the world wide web to facilitate data interchange between customers and their suppliers. For example, the travel industry makes extensive use of the world wide web to link travel agents with their suppliers, such as airlines, hotels, car rental agencies, and so on. To obtain information from any supplier's web site, the travel agent must first launch his/her browser and enter in the supplier's URL. The browser then access the supplier's web site and downloads the supplier's initial web pages, which are viewed in the browser window. The supplier's web site will usually have a variety of features, such as a searchable database of products and services and on-line ordering features for ordering products or services. To access the searching and ordering features of the supplier's web site, the travel agent may need to first log into the web site using a user name and password. After logging onto the web site, the travel agent can then search for or order a particular product by filling out an online form. In addition to fields which must be filled in, these online forms usually incorporate such things as drop down menus and calendars. After the online form is filled in, the user then submits the form, which causes the supplier's web site to transmit the information in the submitted form to the supplier's web server. The supplier's web server then processes the information in the form and submits the results to the travel agents browser, which displays the results in the browser window.

As can be appreciated, the process of logging into web sites, filling out forms and waiting for the results can take several minutes for each supplier web site consulted by the travel agent. Usually, travel agents are required to investigate alternative possible choices for their customers (different airlines, airports, departure dates, flight times, and so on). As a result, the travel agent will have to access several different web sites from several different competing suppliers. It is estimated that it can take as long as 15 to 30 minutes for a travel agent to check as few as 5 to 10 different supplier web sites. Furthermore, since a different web site would have to be accessed for each supplier, it is difficult to compare between several different suppliers to determine which supplier provides the best product at the best price. A system which automatically enters and retrieves data from web sites with search requests originating from a client's computer would help customers and travel agents to compare offerings, by searching multiple web pages letting the customer select an optimal travel choice, and then book the transaction.

SUMMARY OF THE INVENTION

The present system overcomes the disadvantages of the prior art by providing a system for controlling a web browser resident on a user computer to automatically fill in web enabled forms on a target web site with search parameter information. The system includes a web information database file, said information database file containing a plurality of records relating to a plurality of web sites, including the target web site, each record containing a plurality of information fields including an address field having the URL of the web site and a soft coding field, the soft coding field having the particular coding instructions required by the web browser application to log onto, navigate and populate the web enabled forms of the web site at the URL. The system also includes a web agent application, the web agent application configured to read the web information database file and search the information contained in the web information database file in response to the search parameter information. The web agent application is configured to generate a packet of information corresponding to the search, said packet of information containing a least one web site URL and the search parameters used. The web interact application is also configured to read information from the web information database file and to read the packet of information from the web agent application. The web interact application is also configured to launch the web browser application to open a browser window and to control the operation of the web browser window. The web interact application is further configured to cause the browser application to navigate to the target web site by inserting the URL of the target web site into the browser. Finally, the web interact application is further configured to use the soft coding instructions to cause the web browser application to populate web enabled forms on the target web site with parameter data from the information package.

DESCRIPTION OF THE DRAWINGS

In the drawings like characters of reference indicate corresponding parts in the different figures.

DETAILED DESCRIPTION OF THE INVENTION

Figure 1:
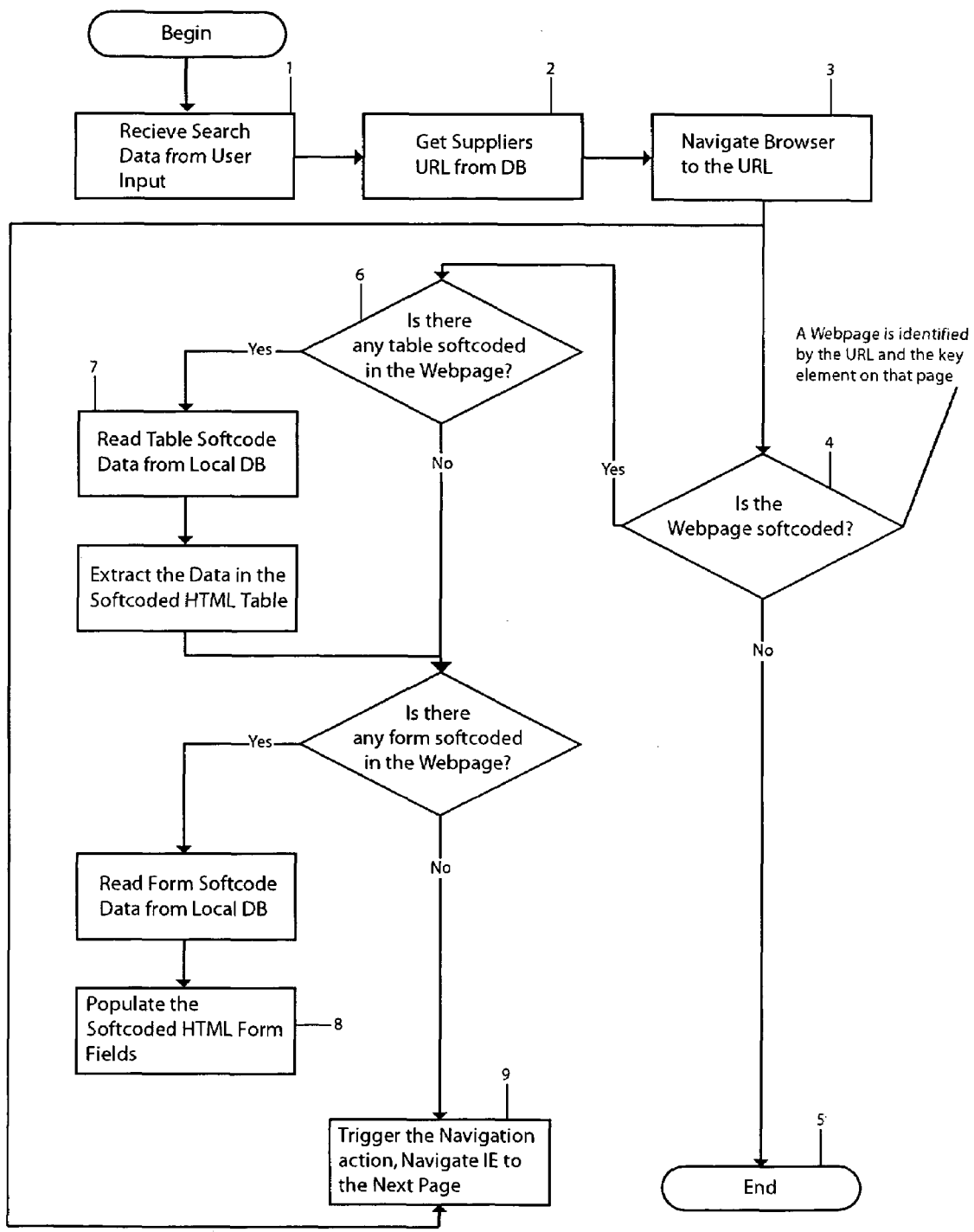
FIG. 1. is a flowchart that describes the soft-coded web search process, showing the steps and algorithms of the data interchange process.

The present invention is a process that can be used to facilitate rapid and accurate data interchange, including data population, data extraction, data import and data export between a client computer application interface and any Internet or World Wide Web site, location or web page, regardless of the technology or technologies on which that web page, or site is based.

The invention includes a number of computer software and networking components, elements, and interactions. The invention uses the structure, connectivity, protocols, interfaces, and functions of the Internet, the World Wide Web, web sites, web pages, and networks to fill in web-based forms, provide required data, click links, and otherwise navigate through and interact with web pages. In addition, the invention has features to extract data from web pages.

The invention uses a process herein referred to as "soft-coding" or "softcoding" to store, maintain, and use configurable information about any given web page's structure and content in order to import to and extract data from the page, to alter the behavior and attributes of any given web page, and to use its navigation and command triggers and capabilities. Soft-coding, in terms of this invention means configuring, programming, accessing, maintaining, storing, retrieving, and otherwise using and manipulating settings, configurations, instructions for data interchange processes, and properties of the data and the data interchange methods to be used with a given destination web page.

The invention uses soft-coding processes to facilitate rapid modification to data's content; modification to procedures for interacting with destination web pages; and modification to data population and extraction methods in the event of changes in the content, presentation, or underlying technology of the web site in question. The client application interface receives updated configurations, settings, and information pertaining to the web page that has changed so that accurate data interchange can take place with little or no user interaction.

This invention differs from previous technology in that it allows the aforementioned data interchange features between client computers and any type of Internet or World Wide Web site or web page, regardless of the technology or technologies on which that web page, or site is based. The only direct connection that is made to the web page being interacted with is with the client computer, which receives stored soft-coded data from a soft-code web server. The invention functions over the Internet and networked computers. The latest version of the invention that has been build works with most current, common web page and Internet technologies.

This process can be used to provide a type and an extent of data transfer and data management that was not previously attainable. The invention can be used to interact with web pages on the Internet in a way that was not previously possible. Working versions of this invention have been built for use in the travel industry as a method of automating data population and retrieval processes with supplier web pages.

Figure 2:
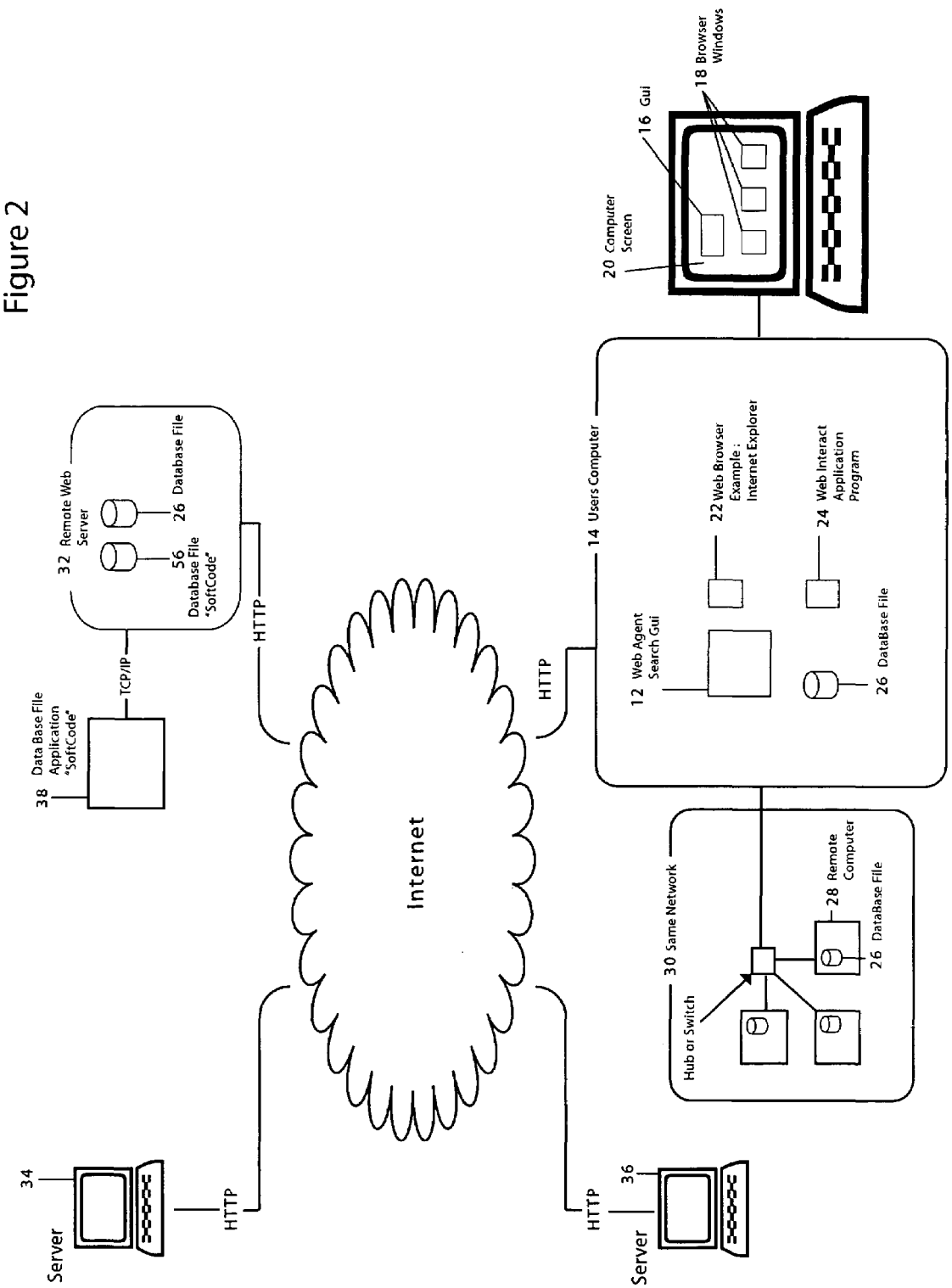
FIG. 2. is a diagram of the data interchange methods for the process showing the different computers and transport methods involved in the data interchange and other features of the process.

Referring to FIG. 2, the system of the present invention, shown generally as 10, includes a number of different executables resident on the user's computer 14, namely web browser applications 22, web agent applications 12 and web interact applications 24 and a web information database file 26 which is resident on either the user's computer, a remote computer 28 which is part of the same network 30 which the user's computer is part of, or a remote web server 32 which is coupled to computer 14 through the Internet. Web browser application 22 may be a standard web browsing application such as, for example, Microsoft Explorer™. Web interact application 24 is an application configured to launch and exchange information with the web browser application 22. Web interact application 24 is configured to read information from web agent 12, read information from a database file 26, automatically launch a web browser window 18, point the web browser to a particular web server (for example server 34 or 35) by automatically filing in the destination URL into the web browser application, receive information from the web browser as to the contents of the web pages received from the web server and automatically fill in web forms contained in the Web pages received from the web server.

Web agent application 12 is configured to display and receive information from a user via graphical user interface (GUI) 16 displayed on screen 20 of the user's monitor. Web agent application 12 is configured to access database file 26 which includes information on a plurality of suppliers. The contents of database file 38 is tailored to the intended user; for example, if the intended user is a travel agent, database file 26 will have information concerning a large number of different suppliers to the travel industry, such as airlines, rental car companies, hotels, and the like. The database file 26 will have a record for each supplier, including the suppliers name and the products and services that supplier provides. The database records in database file 26 may also include one or more information fields identifying the supplier as a preferred supplier or identifying the supplier as having a special contractual relationship with the travel agent/user.

Figure 5:
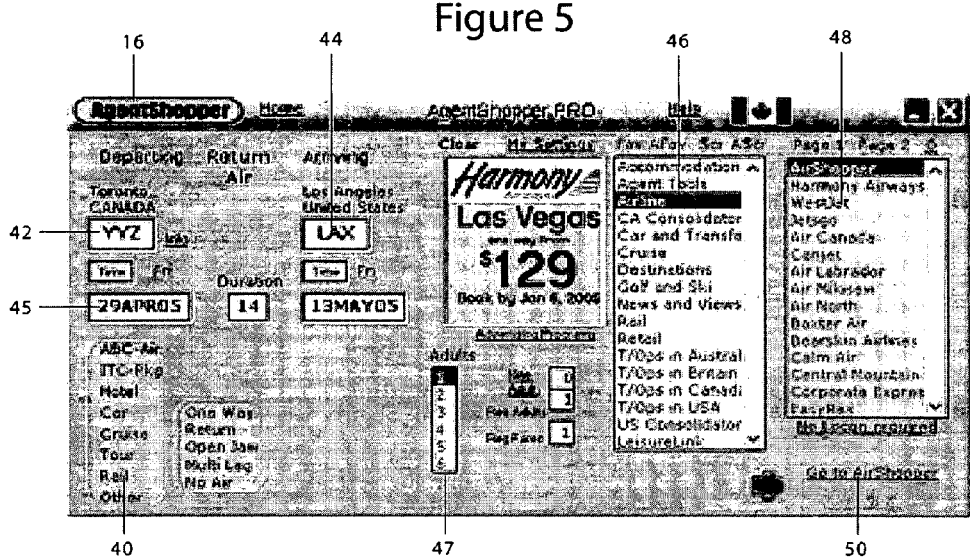
FIG. 5. is a diagram showing the GUI of the web agent application portion of the present invention.

As best seen in FIG. 5, GUI 16 displays database information on a plurality of different suppliers in a number of different windows. The supplier information displayed in GUI 16 is arranged to permit the user to choose particular products to be supplied and to select the desired suppliers. The particular example shown in FIG. 5 shows information relevant to a travel agent, and includes window 40 wherein different products are listed, window 42 wherein the departing city is listed, window 44 wherein the destination city is listed, windows 45 wherein the departure dates are listed, window 47 wherein the number of travelers are listed, window 46 wherein the type of supplier is listed and window 48 wherein the particular suppliers are listed. The GUI is configured to permit the user to scroll through the information displayed in the various windows and select the particular dates, numbers, products and supplier as required, thereby permitting the user to search for the particular products to be purchased and select the desired suppliers of those products. GUI also includes an activation button 50 (marked open) which, when activated by the user by clicking onto the button, causes the web agent program to activate the web interact program and transmit the information selected by the user on the GUI to the web interact program. Applications for displaying and entering database information through GUI's are well known in the prior art, and "engines" for building customized applications using GUI's and databases using software such as Visual Basic™ and the like are readily available.

Referring back to FIG. 2, when the user activates the activation button on the GUI, web agent application 12 activates web interact program 24 and transmits a packet of information to the web interact program. The packet of information includes information about the dates, products, numbers and suppliers selected by the user from the GUI. This information is referred to as parameter data, as it will be used by the web interact program to define the parameters of any searches to be performed on the supplier web sites. The web interact application is configured to receive the parameter data from the web agent and then filter the data to obtain the name of the requested supplier. The web interact application is further configured to accesses and extract data from database file 26. Database file 26 contains a plurality of records, at least one record for each supplier. Each database record contains a plurality of fields, and contained in these fields is the supplier's name and URL address of the supplier's web server. In addition, each database record also has one or more fields containing the "soft coding" for each supplier's web server. The soft coding is the particular set of instructions which must be executed by a browser in order to log into the supplier's web server, populate the supplier's web enabled forms and navigate the browser from web page to web page in order to access and perform searches on the server's resident database of products and services. The soft coding also includes the particular set of instructions which must be executed in by the browser order to navigate to, access and activate the online ordering features maintained by the supplier's web server. The soft coding includes coding which functions on most types of web pages, including HTML (Hypertext Mark-up Language), DHTML (Dynamic Hypertext Mark-up Language), ASP (Active Server Pages), Java, XML (Extensible Mark-up Language), NET, and other types of web page coding. It will be appreciated that different supplier web sites will require different coding to permit the browser to log into the web site, navigate the web site and populate online web forms. Since different coding is required for different supplier web sites, each database record in database file 26 will contain slightly different soft coding instructions in the soft coding fields.

Figure 3:
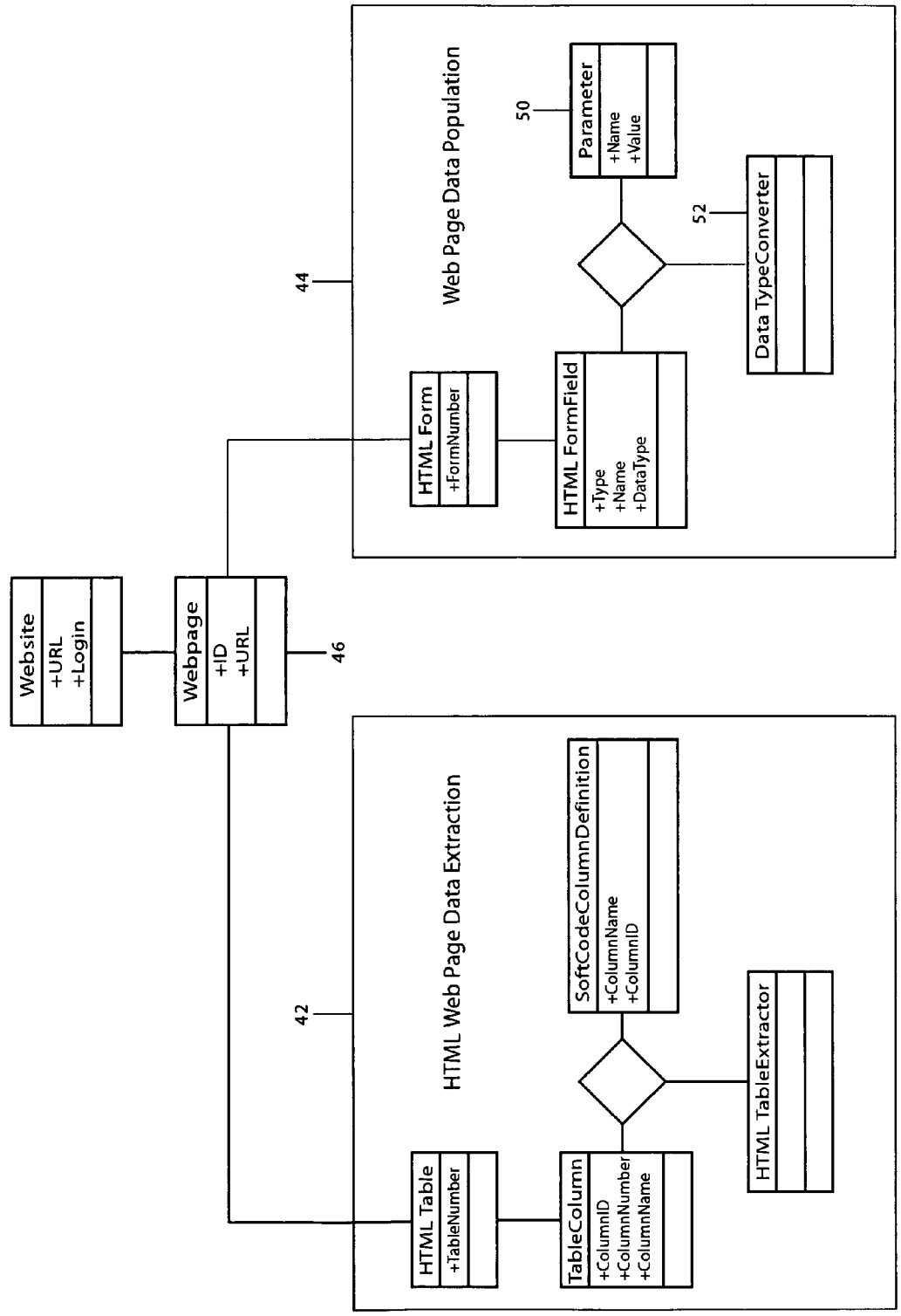
FIG. 3. is a database diagram showing shows the data structure (tables, fields, and relationships) of the data entities stored on database servers and used in the server-side part of the process.

Referring now to FIG. 3 the web interact application is configured to launch browser application 22 (FIG. 2) after receiving an information packet from the web agent application and then navigate the opened browser to the Supplier's URL. The web interact application includes a web page data extraction module 42 which is configured to scan the HTML code for the web pages loaded from the supplier's server into the user's web browser to determine what type of web pages they are and if the web pages include any extractable data or any forms such as log in forms or search forms. The web interact application also has a web page population module 44 which is configured to fill in (or populate) the forms contained in the loaded web pages for a particular supplier. For example, module 44 is configured to populate a login form for a supplier web page using the coding instructions contained in the soft coding fields obtained from the database record for that particular supplier. The database record is extracted by module 44 from database file 26 (see FIG. 2). Hence, using the soft coding read from database file 26 (see FIG. 2), the web page population module can automatically log the user's browser into a particular web server by automatically populating the log in forms downloaded from said web server. It will be appreciated that each supplier's web server will have different log in forms and tables, requiring different coding. The soft coding contained in the soft coding field of the data base record for each supplier will include the particular coding required to populate the log in forms for that particular supplier's server.

The web interact application is further adapted to trigger the navigation action of the browser to navigate the browser to the next page of the supplier's web site after the user has been logged into the supplier's web site. The web interact application is further adapted to fill out additional forms contained in the web pages downloaded by the browser from the supplier's web server, including search forms, order forms and the like. Again, the particular coding necessary to navigate the browser and fill in the web based forms is contained in the soft coding fields of the database record for that supplier which is read by the web interact application.

Referring back to FIG. 2, the web interact application is further adapted to open a browser window 18 on the user's computer screen 20 and display the supplier's web pages in the browser window as the web interact application automatically fills in the supplier's web forms and navigates the web browser through the supplier's web site. Preferably, the results pages of searches automatically performed by the browser and web interact application are displayed in browser windows 18.

Referring now to FIG. 3, a schematic representation of how web page extraction modules 42 and web page population modules 44 operate is shown. A web page 46 is first scanned to determine if it contains (i.e. if application 24 recognizes) either a form which can be populated or data which can be extracted. If web page 46 contains (i.e. if application 24 recognizes) data which can be extracted, say for example, if web page 46 contains extractable data (i.e. data which application 24 has soft coding to recognize), then the web page is analyzed by the web page extraction module 42. For the sake of simplicity, let us consider a web page which contains data in one or more tables. The web page extraction module first identifies the data in the web page and creates a table of data. The columns of each table are then examined, column identifiers (ids) are assigned as well as the column numbers, the column names and the contents of each column. The information in the table is then cross referenced with the soft code column definitions which is loaded from database file. Using the soft coded column definitions, extraction module 42 can extract the data in the table into a structured HTML table. For example, let us assume that web page 46 contains an HTML table having 4 rows and 4 columns. The names of the rows and columns are read, as well as the table's contents. The soft coding column definitions will contain instructions on which columns of which tables be extracted and into which columns in the resulting HTML table the data is to be placed. The end result is data which is contained in a structured HTML table. Another software module, such as a summarizing module (not shown) can then read the data contained in the structured HTML table to generate a summary or report, which may be viewed by the user.

Similarly, population module 44 scans the HTML forms contained on page 46 and identifies whether or not the page contains any forms which are to be populated by the parameter data obtained from the web agent application. The population module identifies each form contained on the page by assigning it a form number. It will be appreciated that each HTML form will have a number of fields and that each field will have a label. Also, each field usually is either a text box field, a list box field, a check box field or a combination field. Furthermore, the data in each field may have to be inserted in a particular format. For example, if a particular field is to contain a departure date, the field may require the date to be entered as an eight digit number representing the day, month and year of the departure date, for example 16042004 representing Apr. 16, 2004. It will be appreciated that similar fields in similar forms on different web sites may require data to be entered in a different format. Therefore, a similar form field on the web page on a different web site may require the same date to be entered as 20040416, while in another web site, the same date may have to be entered as Apr. 16, 2004.

After the fields are identified, module 44 will populate the form fields with the parameter data 50 obtained from the web agent by following the soft coded instructions for that particular form. For example, the soft coding instructions may instruct module 44 to fill in a particular entry field in web page 46 with a particular date from the parameter data. The soft coding is selected to ensure that the data is entered in the correct form field in a form acceptable to the field. If a particular portion of the parameter data is not in a format acceptable to the form field, the module converts the data into the appropriate format by data type convertor 52.

Figure 4:
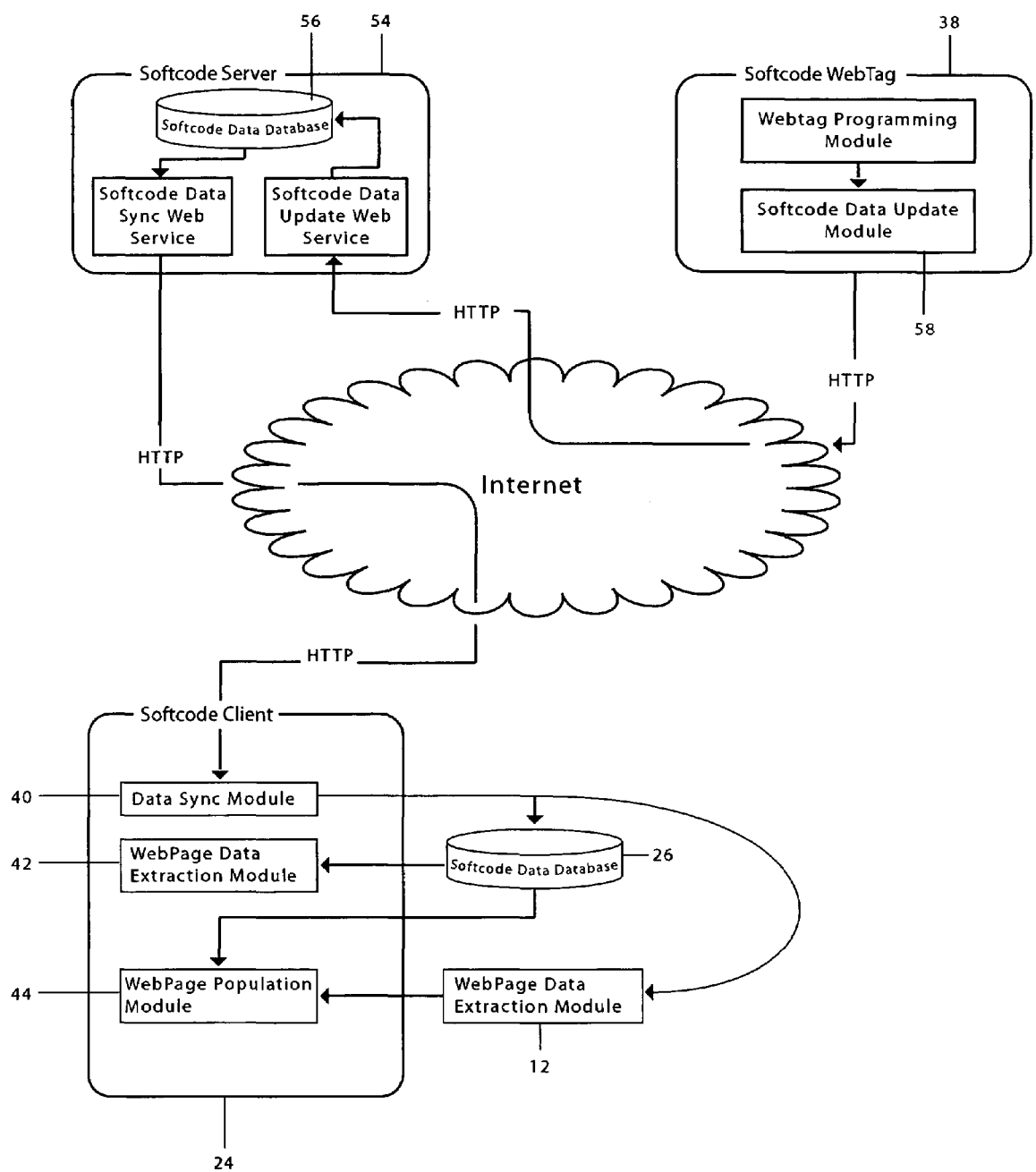
FIG. 4. is a diagram of the components of the soft code part of process, showing the computers, flow, and transport methods of the process.

Referring back to FIGS. 2 and 4, it will be appreciated that the soft coding for each web site will be different. It will also be appreciated that suppliers will periodically modify their web sites. As a result, the soft coding necessary to ensure that the proper web page data extraction and web page data population functions are performed accurately will have to be updated regularly. In order to facilitate the updating of the soft coding, a remote soft coding server 54 is maintained by an operator. The soft coding server is operatively coupled to user computers 14 via the Internet. Resident on server 54 is a soft code data database 56 which contains the soft code database file 26 which is accessed by web agent application 16 and web interact application 24. Soft code data database 56 is periodically updated to ensure that the soft code data files are accurate and current. This requires an operator at computer 38 to periodically survey supplier web servers 34, 36 and so on. After the operator surveys the supplier web servers or receives a manual or automated message of a failed search, the operator re-programs soft code data database 56 using a soft code data update module 58. The updated soft coding is then downloaded to the soft code data database 56. The updated soft coding in database 56 is then transmitted via the Internet to a data sync module 40 loaded in the client's computer (or where ever data base file 26 is located). Data sync module 40 automatically updates data base file 26 with the updated soft code files. Preferably, data sync module 40 is configured to periodically (say once ever hour) access server 54 and receive updated soft code data.

Figure 6:
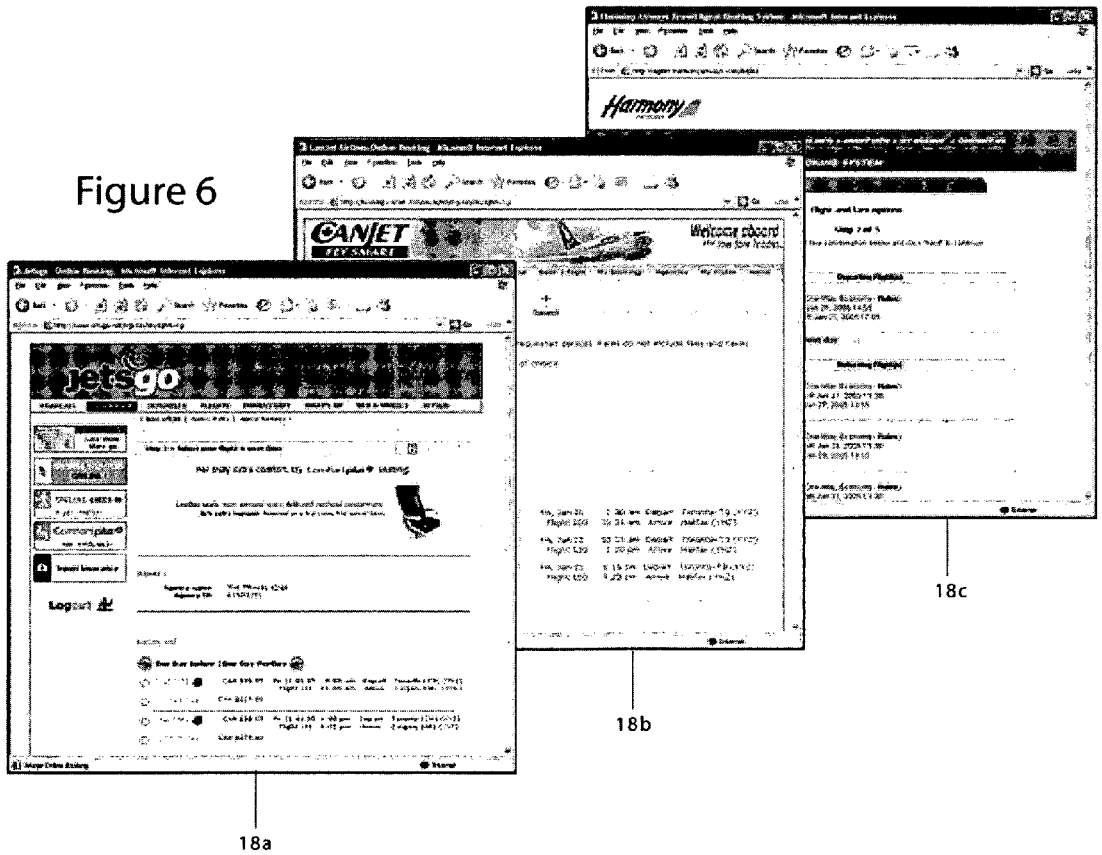
FIG. 6. is a diagram showing a plurality of browser windows which each show the results of an automatic web navigation.

How the system is used by a user to perform numerous on line supplier searches will now be explained with reference to FIGS. 5 and 6. The user launches web agent application 16 on his/her computer and GUI 16 appears. The user then enters his search criteria, such as departure date, departure city, destination city, length of stay, number traveling and the suppliers which the user wishes to obtain quotations for. The user then selects the activation button 50 on GUTI 16 and the web agent application launches one or more web interact applications. One web interact application is launched for each supplier selected by the user. Each web interact application launches a browser window. In this example, the user selected three different suppliers, so three different web interact applications are launched, and three separate browsers are launched. Each interact application navigates its respective browser to a supplier web site and logs the user into the supplier web site. Each interact application subsequently navigates its respective supplier web site, automatically filling in forms and extracting data as the browser navigates through the web site. The results of the navigation are then displayed in the browser window. In this case, after several seconds to a few minutes, web browser windows 18a, 18b and 18c are opened and the search results of each web site is revealed in the respective window. The user can therefore easily compare between the different suppliers since all three suppliers have there search results revealed. This permits the user to quickly search the web sites of several different supplier web sites simultaneously.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

The invention claimed is:

1. A system for automatically filling in web enabled forms in web pages comprising:
   (a) a plurality of supplier web sites operatively coupled to the Internet, each web site having searchable supplier databases and web pages with web enabled forms;
   (b) a first computer operatively coupled to the Internet and having the following applications loaded therein, namely
      (i) a web browser application,
      (ii) a web information database file, said information database containing information relating to the supplies in a plurality of information fields including an address field having the web address of the supplier and a soft coding field having the particular soft coding instructions required by the web browser application to log onto supplier's web site, navigate the supplier's web site, populate the supplier's web enabled forms and generate searches on the supplier's database;
      (iii) a web agent application, the web agent application configured to read the web information database file and display information concerning the suppliers in a graphical user interface, the web agent application being further configured to generate a search of the information contained in the web information database file relating to at least one search criteria and to generate a packet of information corresponding to the search, said packet of information containing a least one supplier name and the search criteria;
      (iv) a web interact application configured to read information from the web information database file and to read the packet of information from the web agent application, said web interact application being further configured to launch the web browser application to open a browser window for the supplier listed in the information packet, the web interact application being further configured to cause the browser application to navigate to the supplier web sites using information read from the web information database, the web interact application being further configured to use the soft coding to cause the web browser application to log onto the supplier web site and populate web enable forms on the supplier web site, the web interact application being further configured to use the soft coding to cause the web browser application to perform a search on the supplier's database using the search criteria and to display the search results in the browser window.

2. The system of claim 1 wherein the packet of information contains a plurality of supplier names and wherein the web agent application launches the web interact application for each supplier listed in the packet of information.

3. The system of claim 2 further including a soft coding server operatively coupled to the Internet, a soft coding database being resident on the soft coding server, the soft coding database having a soft coding field for each supplier, the soft coding fields being periodically updated to ensure that they are accurate and current, and wherein the first computer has an update module, the update module being configured to periodically log onto the soft coding server and update the soft coding fields of the web information database files with the soft coding fields of the soft coding database.

4. The system of claim 1 wherein the web interact application includes a web page population module, the web page population module being configured to scan the HTML code for the page and identify web forms on the web page, the web page population module being further configured to identify the fields of the web page forms and populate the fields in the web forms with data from the search criteria by following the soft coding instructions for that website.

5. The system of claim 3 wherein the web interact application includes a web page population module, the web page population module being configured to scan the HTML code for the page and identify web forms on the web page, the web page population module being further configured to identify the fields of the web page forms and populate the fields in the web forms with data from the search criteria by following the soft coding instructions for that website.

6. A system for automatically filling in fields in web pages comprising:
(a) a plurality of supplier web sites operatively coupled to the Internet, each web site having searchable supplier databases and web pages with web enabled forms;
(b) a user computer operatively coupled to the Internet and having the following applications loaded therein, namely
(i) a web browser application,
(ii) a web information database file, said information database containing a plurality of records relating to the suppliers, each record containing a plurality of information fields including an address field having the URL of the supplier web site and a soft coding field, the soft coding field having the particular coding instructions required by the web browser application to log onto supplier's web site, navigate the supplier's web site, populate the supplier's web enabled forms and generate searches on the supplier's database;
(iii) a web agent application, the web agent application configured to read the web information database file and display information concerning the suppliers in a graphical user interface, the web agent application being further configured to generate a search of the information contained in the web information database file relating to at least one search parameter and to generate a packet of information corresponding to the search, said packet of information containing a least one supplier name and the search parameters used;
(iv) a web interact application configured to read information from the web information database file and to read the packet of information from the web agent application, said web interact application being further configured to launch the web browser application to open a browser window and to control the operation of the web browser window, the web interact application being further configured to cause the browser application to navigate to the supplier web site by inserting the URL of the supplier web site into the browser, the web interact application being further configured to use the soft coding instructions to cause he web browser application to populate web enabled forms on the supplier web site with parameter data from the information package.

7. The system of claim 6 wherein the web interact application is further configured to use the soft coding instructions to cause the web browser application to perform a search on the supplier's database using the parameter data and to display the search results in the browser window.

8. The system of claim 7 wherein the packet of information contains a plurality of supplier names and wherein the web agent application launches the web interact application for each supplier listed in the packet of information resulting in a separate browser window being opened for each supplier.

9. The system of claim 8 further including a soft coding server operatively coupled to the Internet, a soft coding database being resident on the soft coding server, the soft coding database having a soft coding field for each supplier, the soft coding instructions contained in the soft coding fields being periodically updated to ensure that they are accurate and current, and wherein the first computer has an update module, the update module being configured to periodically log onto the soft coding server and update the soft coding instructions in the soft coding fields of the web information database files with the soft coding instructions contained in the soft coding fields of the soft coding database.

10. The system of claim 9 wherein the web interact application includes a web page population module, the web page population module being configured to scan the HTML code for the page and identify web forms on the web page, the web page population module being further configured to identify the fields of the web page forms and populate the fields in the web forms with data from the search criteria by following the soft coding instructions for that website.

11. The system of claim 8 wherein the web interact application includes a web page population module, the web page population module being configured to scan the HTML code for the page and identify web forms on the web page, the web page population module being further configured to identify the fields of the web page forms and populate the fields in the web forms with data from the search criteria by following the soft coding instructions for that website.

12. A system for controlling a web browser resident on a user computer to automatically fill in web enabled forms on a target web site with search parameter information, the system comprising:
a computer operatively coupled to the Internet and having the following applications loaded therein, namely
a) a web information database file, said information database file containing a plurality of records relating to a plurality of web sites, including the target web site, each record containing a plurality of information fields including an address field having the URL of the web site and a soft coding field, the soft coding field having the particular coding instructions required by the web browser application to log onto, navigate and populate the web enabled forms of the web site at the URL;
b) a web agent application, the web agent application configured to read the web information database file and search the information contained in the web information database file in response to the search parameter information, the web agent application being further configured to generate a packet of information corresponding to the search, said packet of information containing a least one web site URL and the search parameters used;
c) a web interact application configured to read information from the web information database file and to read the packet of information from the web agent application, said web interact application being further configured to launch the web browser application to open a browser window and to control the operation of the web browser window, the web interact application being further configured to cause the browser application to navigate to the target web site by inserting the URL of the target web site into the browser, the web interact application being further configured to use the soft coding instructions to cause the web browser application to populate web enabled forms on the target web site with parameter data from the information package.

13. The system of claim 12 wherein the web interact application is further configured to use the soft coding instructions to cause the web browser application to perform a search on the supplier's database using the parameter data and to display the search results in the browser window.

14. The system of claim 13 wherein the packet of information contains a plurality of target web site URLs and wherein the web agent application launches the web interact application for each web site listed in the packet of information resulting in a separate browser window being opened for each web site.

15. The system of claim 14 further including a soft coding server operatively coupled to the Internet, a soft coding database being resident on the soft coding server, the soft coding database having a soft coding field for each target web site, the soft coding instructions contained in the soft coding fields being periodically updated to ensure that they are accurate and current, and further including an update module, the update module being configured to periodically log onto the soft coding server and update the soft coding instructions in the soft coding fields of the web information database files with the soft coding instructions contained in the soft coding fields of the soft coding database.

16. The system of claim 15 wherein the web interact application includes a web page population module, the web page population module being configured to scan the HTML code for the target web page and identify web forms on the web page, the web page population module being further configured to identify the fields of the web page forms and populate the fields in the web forms with search parameter data by following the soft coding instructions for that web site's web page.

* * * * *